(12) United States Patent
An et al.

(10) Patent No.: US 11,915,641 B2
(45) Date of Patent: Feb. 27, 2024

(54) DISPLAY APPARATUS AND CONTROLLING METHOD THEREOF

(71) Applicant: Samsung Electronics Co., Ltd., Suwon-si (KR)

(72) Inventors: Jinsung An, Suwon-si (KR); Sungju Lee, Suwon-si (KR); Seungsin Lee, Suwon-si (KR); Seoyoung Jung, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/185,869

(22) Filed: Mar. 17, 2023

(65) Prior Publication Data

US 2023/0230538 A1 Jul. 20, 2023

Related U.S. Application Data

(63) Continuation of application No. PCT/KR2022/019474, filed on Dec. 2, 2022.

(30) Foreign Application Priority Data

Dec. 15, 2021 (KR) .................. 10-2021-0180116

(51) Int. Cl.
*G09G 3/00* (2006.01)
*G06F 3/16* (2006.01)
(Continued)

(52) U.S. Cl.
CPC ............. *G09G 3/32* (2013.01); *G09G 3/3426* (2013.01); *G09G 3/3611* (2013.01); *H04S 3/008* (2013.01);
(Continued)

(58) Field of Classification Search
CPC ...... G09G 3/32; G09G 3/3426; G09G 3/2611; G09G 2310/08; G09G 2320/0686;
(Continued)

(56) References Cited

U.S. PATENT DOCUMENTS 9,030,386 B2   5/2015 Park
10,237,669 B2   3/2019 Jin et al.
(Continued)

FOREIGN PATENT DOCUMENTS

JP    11-232488 A    8/1999
JP    2012-133250 A    7/2012
(Continued)

OTHER PUBLICATIONS

International Search Report and Written Opinion dated Mar. 20, 2023, issued in International Patent Application No. PCT/KR2022/019474.

*Primary Examiner* — Sanghyuk Park
(74) *Attorney, Agent, or Firm* — Jefferson IP Law, LLP

(57) ABSTRACT

A display apparatus is provided. The display apparatus includes a display panel comprising a plurality of pixels, a driver configured to drive the display panel, and at least one processor. The at least one processor may, based on receiving content comprising video content and audio content, obtain sound location information based on multi-channel information included in the audio content, identify one area of the video content corresponding to the obtained sound location information, and control the driver to adjust brightness of pixels included in the identified one area.

18 Claims, 12 Drawing Sheets

(51) Int. Cl.
*G09G 3/32* (2016.01)
*G09G 3/34* (2006.01)
*G09G 3/36* (2006.01)
*H04S 3/00* (2006.01)
*H04S 7/00* (2006.01)

(52) U.S. Cl.
CPC ......... *H04S 7/302* (2013.01); *G09G 2310/08* (2013.01); *G09G 2320/0686* (2013.01); *G09G 2320/106* (2013.01); *H04S 2400/01* (2013.01); *H04S 2400/11* (2013.01)

(58) Field of Classification Search
CPC ... G09G 2320/106; H04S 3/008; H04S 7/302; H04S 2400/01; H04S 2400/11; G06F 3/16
See application file for complete search history.

(56) References Cited

U.S. PATENT DOCUMENTS

| | | | |
|---|---|---|---|
| 10,353,198 | B2 | 7/2019 | Sakai |
| 10,360,847 | B2 | 7/2019 | Lee et al. |
| 11,138,937 | B2 | 10/2021 | Park et al. |
| 11,594,181 | B2 | 2/2023 | Park et al. |
| 2012/0082332 | A1 | 4/2012 | Park |
| 2012/0162259 | A1 | 6/2012 | Sakai |
| 2017/0011692 | A1 | 1/2017 | Lee et al. |
| 2017/0083280 | A1 | 3/2017 | Yu et al. |
| 2017/0105081 | A1* | 4/2017 | Jin ............... G10H 1/00 |
| 2017/0251171 | A1* | 8/2017 | Yamada ......... H04B 10/116 |
| 2019/0199958 | A1* | 6/2019 | Abe ............... H04R 1/028 |
| 2020/0260542 | A1* | 8/2020 | Fan ............... A63F 13/537 |
| 2021/0012717 | A1 | 1/2021 | Park et al. |
| 2021/0142072 | A1 | 5/2021 | Matsumoto et al. |
| 2021/0146237 | A1 | 5/2021 | Saville et al. |
| 2022/0028341 | A1 | 1/2022 | Park et al. |

FOREIGN PATENT DOCUMENTS

| | | |
|---|---|---|
| JP | 2019-193163 A | 10/2019 |
| KR | 10-2005-0024561 A | 3/2005 |
| KR | 10-2008-0085551 A | 9/2008 |
| KR | 10-2010-0129920 A | 12/2010 |
| KR | 10-2015-0117351 A | 10/2015 |
| KR | 10-2017-0006969 A | 1/2017 |
| KR | 10-2017-0035502 A | 3/2017 |
| KR | 10-2017-0041447 A | 4/2017 |
| KR | 10-2021-0007455 A | 1/2021 |

* cited by examiner

DISPLAY APPARATUS AND CONTROLLING METHOD THEREOF

CROSS-REFERENCE TO RELATED APPLICATION(S)

This application is a continuation application, claiming priority under § 365(c), of an International application No. PCT/KR2022/019474, filed on Dec. 2, 2022, which is based on and claims the benefit of a Korean patent application number 10-2021-0180116, filed on Dec. 15, 2021, in the Korean Intellectual Property Office, the disclosure of which is incorporated by reference herein in its entirety.

TECHNICAL FIELD

This disclosure relates to a display apparatus and a controlling method thereof. More particularly, the disclosure relates to a display apparatus for controlling a light source included in a display to provide a visual effect corresponding to a sound of the content, and a controlling method thereof.

BACKGROUND ART

A display apparatus that provides a visual effect corresponding to a sound of the content provided through the device is widely distributed. Such a display apparatus may provide a user with a visual effect corresponding to the sound, through a display, to a user who lost hearing or has weak hearing, thereby increasing attentional engagement in the content of the user.

However, a related-art display apparatus may provide a visual effect such as a caption or a sign language related to the sound of the content, so that a user may not intuitively sense the sound of the content through the visual effect. Accordingly, there is a continuous need for a method for providing a visual effect, which enables a user to intuitively feel sound.

The above information is presented as background information only to assist with an understanding of the disclosure. No determination has been made, and no assertion is made, as to whether any of the above might be applicable as prior art with regard to the disclosure.

DISCLOSURE

Aspects of the disclosure are to address at least the above-mentioned problems and/or disadvantages and to provide at least the advantages described below. Accordingly, an aspect of the disclosure is to provide a visual effect corresponding to the sound of the content, and a controlling method thereof.

Additional aspects will be set forth in part in the description which follows and, in part, will be apparent from the description, or may be learned by practice of the presented embodiments.

In accordance with an aspect of the disclosure, a display apparatus is provided. The display apparatus includes a display panel comprising a plurality of pixels, a driver configured to drive the display panel, and at least one processor configured to, based on receiving content comprising video content and audio content, obtain sound location information based on multi-channel information included in the audio content, identify one area of the video content corresponding to the obtained sound location information, and control the driver to adjust brightness of pixels included in the identified one area.

In accordance with another aspect of the disclosure, a method of controlling is provided. The method includes based on receiving content comprising video content and audio content, obtaining sound location information based on multi-channel information included in the audio content, identifying one area of the video content corresponding to the obtained sound location information, and adjusting brightness of pixels corresponding to the identified one area among a plurality of pixels included in a display panel.

A non-transitory computer readable medium storing computer instructions executed by at least one processor of an electronic apparatus to cause the electronic apparatus perform operations, wherein the operations include, based on receiving content comprising video content and audio content, obtaining sound location information based on multi-channel information included in the audio content, identifying one area of the video content corresponding to the obtained sound location information, and adjusting brightness of pixels corresponding to the identified one area among a plurality of pixels included in a display panel.

Other aspects, advantages, and salient features of the disclosure will become apparent to those skilled in the art from the following detailed description, which, taken in conjunction with the annexed drawings, discloses various embodiments of the disclosure.

DESCRIPTION OF DRAWINGS

The above and other aspects, features, and advantages of certain embodiments of the disclosure will be more apparent from the following description taken in conjunction with the accompanying drawings, in which.

DETAILED DESCRIPTION OF THE EMBODIMENTS

Figure 1:
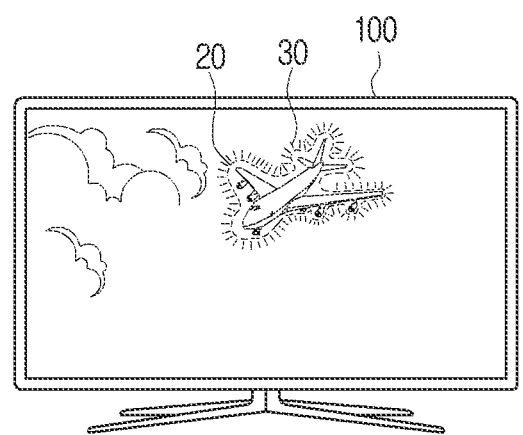
FIG. 1 is a diagram briefly illustrating an operation of providing a visual effect about a sound of a display apparatus according to an embodiment of the disclosure.
Figure 1:
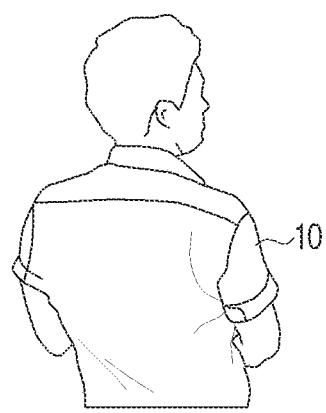

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Expressions such as "have," "may have," "include," "may include" and the like represent presence of corresponding numbers, functions, operations, or parts, and do not exclude the presence of additional features.

Expressions such as "at least one of A or B" and "at least one of A and B" should be understood to represent "A," "B" or "A and B."

As used herein, terms such as "first," and "second," may identify corresponding components, regardless of order and/or importance, and are used to distinguish a component from another without limiting the components.

In addition, a description that one element (e.g., a first element) is operatively or communicatively coupled with/to" or "connected to" another element (e.g., a second element) should be interpreted to include both the first element being directly coupled to the second element, and the first element being coupled to the second element through a third element.

A singular expression includes a plural expression, unless otherwise specified. It is to be understood that terms such as "comprise" or "consist of" are used herein to designate a presence of a characteristic, number, step, operation, element, component, or a combination thereof, and not to preclude a presence or a possibility of adding one or more of other characteristics, numbers, steps, operations, elements, components or a combination thereof.

A term such as "module," "unit," and "part," is used to refer to an element that performs at least one function or operation and that may be implemented as hardware or software, or a combination of hardware and software. Except when each of a plurality of "modules," "units," "parts," and the like must be realized in an individual hardware, the components may be integrated in at least one module or chip and be realized in at least one processor (not shown).

In the following description, a "user" may refer to a person receiving content through a display apparatus but is not limited thereto.

FIG. 1 is a diagram briefly illustrating an operation of providing a visual effect about a sound of a display apparatus according to an embodiment of the disclosure.

Referring to FIG. 1, a display apparatus 100 may provide content including video content and audio content to a user 10. The display apparatus 100 may provide content including audio content including multi-channel information and video content composed of a plurality of frames, but the embodiment is not limited thereto.

The display apparatus 100 may be implemented with various types of devices such as a digital television (TV), a digital versatile disc (DVD) player, a blu-ray disk player, a game machine, a network TV, a smart TV, an Internet TV, a web TV, an Internet Protocol Television (IPTV), signage, PC, a head mounted display (HMD), and a wearable device, but is not limited thereto.

In some embodiments, the display apparatus 100 may provide a visual effect 30 to represent an image included in an area 20 on the video content identified to have a sound to a relatively high brightness as compared to an image included in other areas, based on the audio content.

As such, even the user 10 having a hearing loss or a weak hearing may more intuitively feel the sound of the contents provided through the display apparatus 100. Hereinafter, embodiments of providing a visual effect related to sound by adjusting the brightness of pixels included in an area on the identified video content based on multi-channel information of the audio content will be described in more detail.

Figure 2:
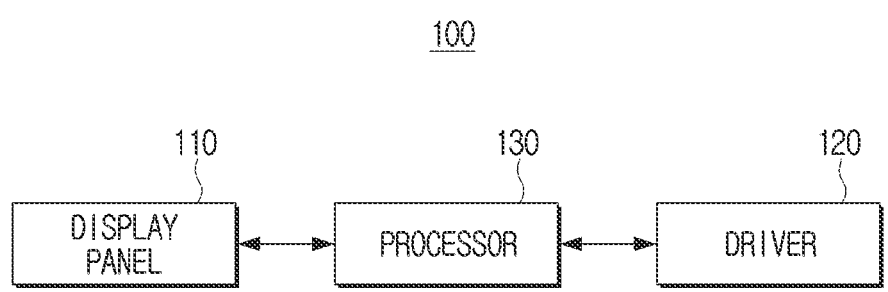
FIG. 2 is a block diagram illustrating a configuration of a display apparatus according to an embodiment of the disclosure.

FIG. 2 is a block diagram illustrating a configuration of a display apparatus according to an embodiment of the disclosure.

Referring to FIG. 2, the display apparatus 100 may include a display panel 110, a driver 120, and at least one processor 130.

The display panel 110 may be configured to provide video content to a user. The display panel 110 may be implemented as a display of various types such as, for example, a liquid crystal display (LCD), organic light emitting diodes (OLED) display, quantum dot light-emitting diodes (QLED), plasma display panel (PDP), and the like. In the display panel 110, a backlight unit, a driving circuit which may be implemented as thin film transistor (TFT), low temperature poly silicon (LTPS) TFT, organic TFT (OTFT), and the like, may be included as well. The display panel 110 may be implemented as a flexible display, a third-dimensional (3D) display, and the like.

The display panel 110 includes a plurality of pixels, and each pixel may include a plurality of subpixels. Each pixel may be composed of three subpixels corresponding to a plurality of lights, for example, red, green, and blue lights (R, G, and B). However, the embodiment is not limited thereto. In some cases, cyan, magenta, yellow, black, or other subpixels may be included, in addition to R, G, and B subpixels.

The driver 120 drives the display panel 110 under the control of the processor 130. In an embodiment, the driver 120 may drive each pixel by applying a driving voltage or flowing a driving current to drive each pixel constituting the display panel 110 under the control of the processor 130.

In another embodiment, the driver 120 may supply driving voltage (or driving current) to the display panel 110 in pulse width modulation (PWM) scheme, and the driver 120 may adjust and output supply time or intensity of driving voltage (or driving voltage) supplied to the display panel 110 to correspond to each signal input from the processor 130.

In yet another embodiment, the driver 120 may include a power supply for supplying power. The power supply may be hardware that converts an alternating current (AC) to a direct current (DC) so as to be stably used in the display panel 110, and supplies power to suit to each system. The power supply may include an electromagnetic interference (EMI) filter, an AC-DC rectifier, a DC-DC switching converter, an output filter, an output unit, and the like. The power supply may be implemented, for example, with a switched mode power supply (SMPS). The SMPS may control the on-off time ratio of the semiconductor switch device to stabilize the output to enable high efficiency, small size, and light weight, and may be used for driving the display panel 110.

The processor 130 is configured to control the overall operation of the display apparatus 100. In an embodiment, the processor 130 may be connected to each configuration of the display apparatus 100 to control the operation of the display apparatus 100 in general. In another embodiment, the processor 130 may be connected to the display panel 110 and the driver 120 to control the operation of the display apparatus 100.

According to yet another embodiment, the processor 130 may be referred to as various names such as a digital signal processor (DSP), a microprocessor, a central processing unit (CPU), a micro controller unit (MCU), a micro processing unit (MPU), a neural processing unit (NPU), a controller, and an application processor (AP), but will be referred to as the processor 130 herein.

The processor 130 may be implemented as a system on chip (SoC) type or a large scale integration (LSI) type, or in a field programmable gate array (FPGA) type. In an embodiment, the processor 130 may include volatile memory such as static random access memory (SRAM).

In another embodiment, the processor 130 may receive content from a source device, such as a set-top box. In yet another embodiment, the processor 130 may receive content including video content and audio content via various types of wireless interfaces, such as a High-Definition Multimedia Interface (HDMI), a Universal Serial Bus (USB), or a Thunderbolt®, or other types of wireless interfaces, such as wireless fidelity (Wi-Fi), Wireless Local Area Network, Bluetooth, or Zigbee.

The audio content may be content including multi-channel information. The multi-channel information, for example, may include a plurality of sound data corresponding to a plurality of channels, and the audio content according to an example may include stereo content including left and right channel information or surround content including three or more channel information. The surround content may be content recorded in a Dolby Atmos scheme, but is not limited thereto.

In a case in which the content is received, the processor 130 may obtain sound location information based on the multi-channel information included in the audio content. Specifically, the processor 130 may obtain information on a location that a user will recognize, through the audio content, as a sound generation point based on the plurality of sound data included in the multi-channel information.

The processor 130 may obtain sound location information based on the sound volume corresponding to each channel included in the multi-channel information, but is not limited thereto.

In an embodiment, the processor 130 may predict a change in a location that a user will recognize through the audio content as a sound generation point based on the obtained sound location information, and obtain vector information including information about a direction and a speed corresponding to the predicted change in the location.

In another embodiment, the processor 130 may identify an area of the video content corresponding to the obtained sound location information. The processor 130 may identify, on the basis of the sound location information, the number of pixels included in the display panel, and information on the shape of the area, an area which a user may identify as a sound generation point through the video content. The information regarding the type of the area may include at least one of the size information of the area or the boundary information of the area, but is not limited thereto.

In yet another embodiment, the processor 130 may obtain a size information of one area of the video content based on the sound volume of the audio content. The processor 130 may identify that the bigger the size of one area of the audio content, the bigger the size of one area of the video content, but the embodiment is not limited thereto.

The processor 130 may control the driver 120 to adjust the brightness of pixels included in an area of the identified video content. In an embodiment, the processor 130 may provide a dimming effect by controlling the driver 120 so that a pixel included in the identified area has a relatively high brightness relative to a pixel included in an area other than the identified area.

In another embodiment, the processor 130 may provide various types of dimming effects. The processor 130 may provide a dimming effect to periodically increase and decrease brightness of pixels included in one area, or may sequentially provide a dimming effect from pixels included in the center of one area to pixels included in an edge of one area.

In yet another embodiment, the processor 130 of the disclosure may adjust the brightness of pixels included in the area of the wider video content as the size of the sound included in the audio content is larger.

In an embodiment, the processor 130 may obtain brightness information of one area of the video content based on the sound volume of the audio content. For example, the processor 130 may control the driver 120 to adjust the brightness of pixels included in one area based on the identified brightness information.

The brightness information of one area may include a target brightness value for adjusting the brightness of pixels included in the identified area, but the processor 130, according to an embodiment, may control the driver 120 so that the pixel included in one area of the video content has a high brightness as the volume of the sound included in the audio content increases.

If at least one area of a specific object is included in the identified area, the processor 130 may control the driver 120 to adjust the brightness of pixels included in the area corresponding to the specific object based on the sound volume of the audio content. For example, if the specific object includes an object corresponding to a predetermined type, and the processor 130 may control the driver 120 so that the pixel included in the area corresponding to the object has a higher brightness than the pixel included in the other area when a part of the specific object is included in one area of the video content.

In an embodiment, the processor 130 may identify a boundary area of a specific object including some or all of the object in one area of the identified video content, and may control the driver 120 to adjust only brightness of pixels included in the identified boundary area.

In a case in which a specific object is included in an area of the identified video content, the processor 130 may control the driver 120 to adjust the brightness of pixels or pixels included in one area based on the sound volume of the audio content and the size of the specific object.

The plurality of pixels of the display panel 110 may include a light emitting diode (LED) pixel, and the processor 130 may identify a dimming value corresponding to the LED pixels included in an identified area, and control the driver 120 to adjust the brightness of the LED pixels included in the identified area based on the identified dimming value. In a case in which the display panel 110 is implemented as an LED display panel, the processor 130 may control the driver 120 to adjust the brightness of the LED pixels included in one area of the content based on a local dimming scheme, since each LED pixel operates as a point light source.

In another embodiment, the processor 130 may control the driver 120 so that the brightness of the LED pixels included in the identified area may be adjusted at the same period when the audio content is identified to include sound more than a threshold size periodically generated.

In a case in which the display panel 110 is implemented as an LCD panel including a plurality of backlight units performing a role of a linear light source, the processor 130 may control the driver 120 to adjust the brightness of the LCD pixels included in one area of the content based on a global dimming scheme. If the LCD panel includes a plurality of backlight units performing a role of a point light source, the processor 130 may control the driver 120 to adjust the brightness of the LCD pixels included in one area of the content based on the local dimming scheme.

In another embodiment, the processor 130 may identify an area of the video content based on the vector information related to the change of the location that a user will recognize through the audio content as a sound generation point, and adjust the brightness of the pixels included in the identified area to provide a dimming effect. In an embodiment, the processor 130 may provide a dimming effect by sequentially controlling the brightness of pixels included in one area based on direction information included in the vector information.

Figure 3:
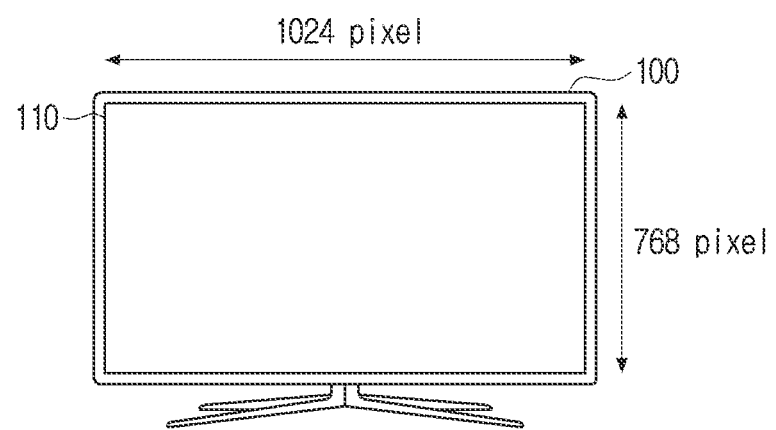
FIG. 3 is a diagram illustrating an operation of identifying one area on a display based on multi-channel information according to an embodiment of the disclosure.
Figure 3:
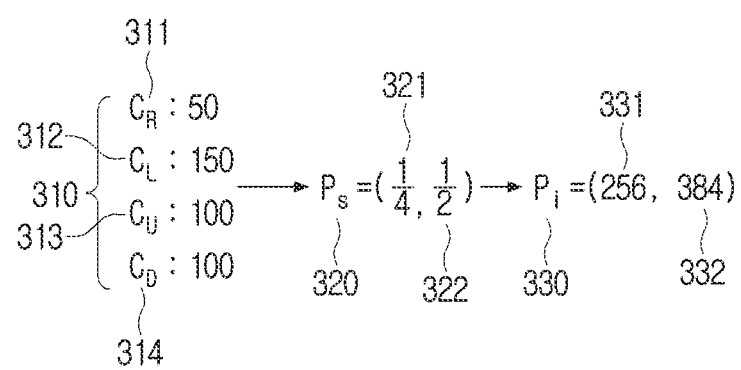

FIG. 3 is a diagram illustrating an operation of identifying one area on a display based on multi-channel information according to an embodiment of the disclosure.

The processor 130 may obtain the sound location information 320 based on the multi-channel information 310 included in the audio content if content including the video content and audio content is received.

The multi-channel information 310, according to an embodiment, may include channel information 311 in the right direction, channel information 312 in the left direction, channel information 313 in the upper direction, and channel information 314 in the downward direction.

In an embodiment, the processor 130 may obtain sound location information 320 based on the volume of the sound corresponding to each of the four channels included in the multi-channel information 310. In another embodiment, the processor 130 may identify ¼ which is the ratio of the magnitude of the sound corresponding to the channel CR in the right direction and the magnitude of the sound corresponding to the channel CL in the left direction as an x-coordinate value 321 of the sound location information 320. The processor 130 may identify ½ which is the ratio of the magnitude of the sound corresponding to the channel (CU) in the upper direction and the magnitude of the sound corresponding to the channel compact disc (CD) in the lower direction as the y coordinate value 322 of the sound location information 320.

In yet another embodiment, the processor 130 may obtain image location information 330 based on the sound location information 320. The image location information 330 may include information about a reference point for determining an area including pixels of which brightness may be adjusted in the video content.

In a case in which the display panel 110 includes a plurality of pixels having an aspect ratio of 1024*768, the processor 130 may identify a value 331 obtained by multiplying the x-coordinate value 321 of the sound location information 320 by the horizontal size of the display panel 110 as the x-coordinate value of the image location information 330. The processor 130 may identify a value 332 obtained by multiplying the y-coordinate value 322 of the sound location information 320 by the vertical size of the display panel 110 as the y-coordinate value of the image location information 330.

The processor 130, as such, may identify a point of the video content based on a coordinate value included in the image location information 330, and may determine an area of the video content including the pixels to adjust the brightness based on an identified point.

Figure 4:
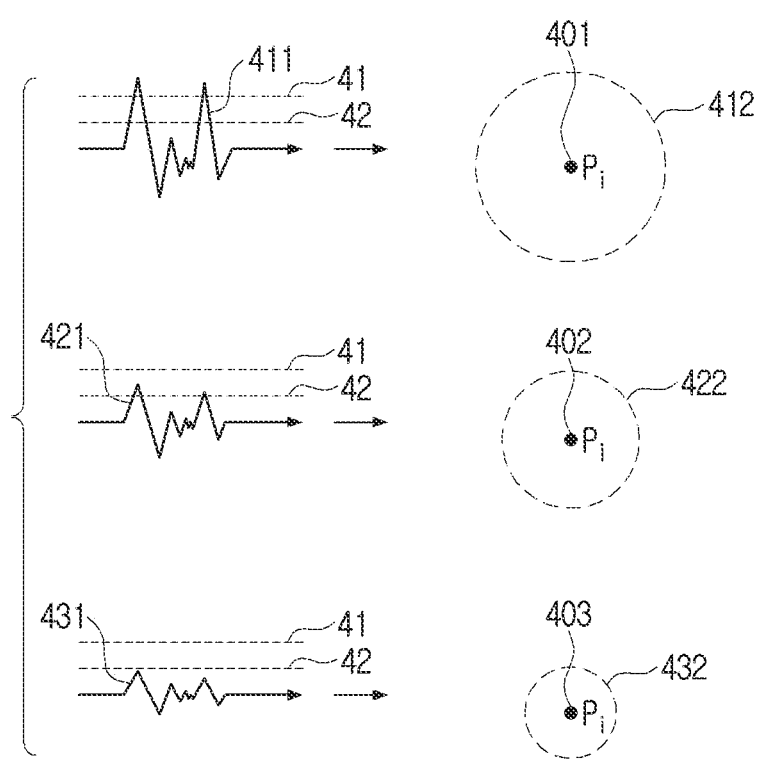
FIG. 4 is a diagram illustrating an operation of identifying one area on a display based on a sound magnitude according to an embodiment of the disclosure.

FIG. 4 is a diagram illustrating an operation of identifying one area on a display based on a sound magnitude according to an embodiment of the disclosure.

Referring to FIG. 4, the processor 130 may identify a size of an area of the video content based on the sound volume of the audio content, and may also control the driver 120 to adjust the brightness of pixels included in the area having the size identified from the reference point included in the image location information. The area may be circular, but is not limited thereto.

The processor 130, according to an example embodiment, may determine the size of an area of the video content by identifying the size of the peak value of the sound included in the audio content based on the predetermined first threshold value 41 and the second threshold value 42 in relation to the volume of the sound.

In response to the audio content 411 including sound having a peak value greater than or equal to the first threshold value 41 is received, the processor 130 may identify that the size of one area of the video content is "large" which is predetermined. In an embodiment, the processor 130 may identify an area 412 having a large size based on one point 401 included in the image location information corresponding to the video content received along with the audio content 411 as an area including pixels to adjust the brightness.

In response to the audio content 421 including sound having a peak value less than the first threshold value 41 and the second threshold value 42 is received, the processor 130 may identify that the size of one area of the video content is "medium" which is predetermined. In another embodiment, the processor 130 may identify an area 422 having a medium size on the basis of one point 402 included in the image location information corresponding to the video content received along with the audio content 421 as an area including pixels to adjust the brightness.

In response to the audio content 431 including sound having a peak value less than the second threshold value 42 is received, the processor 130 may identify that the size of one area of the video content is "small" which is predetermined. In yet another embodiment, the processor 130 may identify an area 432 having a small size on the basis of one point 403 included in the image location information corresponding to the video content received along with the audio content 431, as an area including pixels to adjust the brightness.

According to the operation of the processor 130 described above, the display apparatus 100 may provide a visual effect over a wide area from a point in which a corresponding sound is recognized as the volume of the sound is larger, and accordingly user convenience may be improved.

Figure 5:
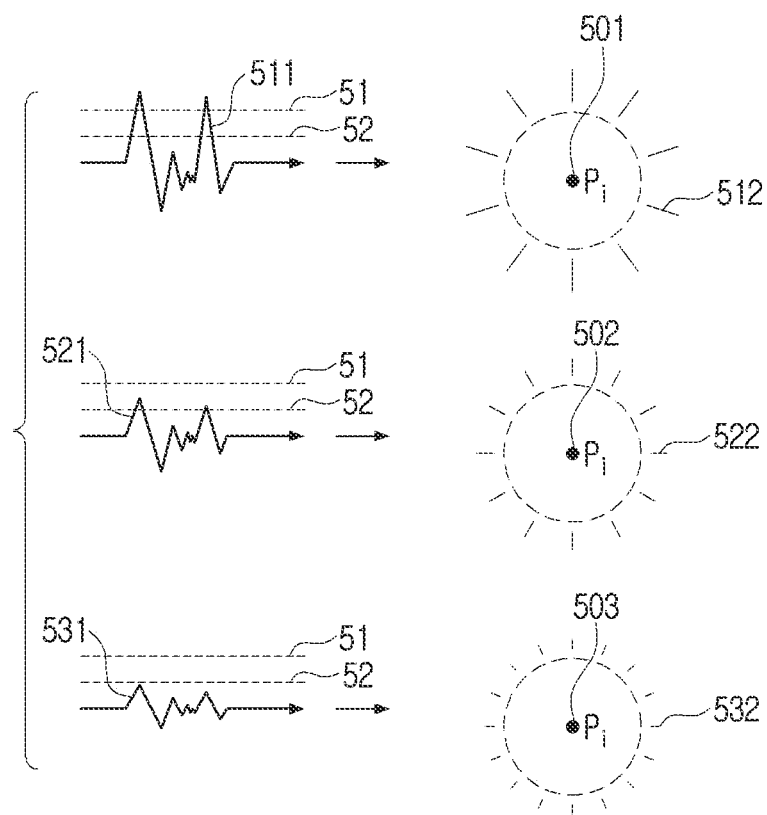
FIG. 5 is a diagram illustrating an operation of obtaining brightness information on a display based on a sound magnitude according to an embodiment of the disclosure.

FIG. 5 is a diagram illustrating an operation of obtaining brightness information on a display based on a sound magnitude according to an embodiment of the disclosure.

Referring to FIG. 5, the processor 130 may obtain brightness information of an area of the video content based on a sound volume of the audio content, and may control the driver 120 to adjust the brightness of pixels included in one area based on the obtained brightness information. In an embodiment, the brightness information may include a target brightness value for adjusting the brightness of pixels included in an area of the video content.

The processor 130, according to an example embodiment, may obtain a target brightness value for one area by identifying a size of a peak value of a sound included in the audio content based on a first threshold value 51 and a second threshold value 52 predetermined with respect to the volume of sound.

In response to audio content 511 including sound having a peak value greater than or equal to the first threshold value 51 is received, the processor 130 may identify that the target brightness value for one area of the video content is "very high" which is predetermined. In an embodiment, the processor 130 may control the driver 120 to emit light 512 having a very high brightness based on one point 501 included in the image location information corresponding to the video content received along with the audio content 511.

In response to the audio content 521 including the sound having the peak value less than the first threshold value 51 and greater than or equal to the second threshold value 52 is received, the processor 130 may identify that the target brightness value for one area of the video content is "high" which is predetermined. In another embodiment, the processor 130 may control the driver 120 so that a pixel included in one area identified based on one point 502 included in the image location information corresponding to the video content received along with the audio content 521 to emit the light 522 having a high brightness.

In response to the audio content 531 including sound having a peak value less than the second threshold value 52 is received, the processor 130 may identify that the target brightness value for one area of the video content is "slightly high". In yet another embodiment, the processor 130 may control the driver 120 so that a pixel included in one area identified based on one point 503 included in the image location information corresponding to the video content received with the audio content 531 to emit light 532 having a slightly high brightness.

According to the operation of the processor 130 described above, the display apparatus 100 may emit bright light through an area which is recognized that a corresponding sound is generated as the size of the sound is larger, thereby improving user convenience.

Figure 6A:
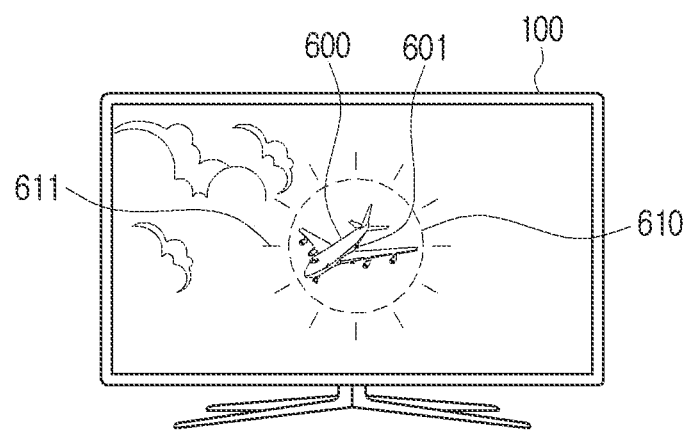
FIGS. 6A and 6B are diagrams illustrating a method of providing a visual effect in consideration of an object according to various embodiments of the disclosure.
Figure 6B:
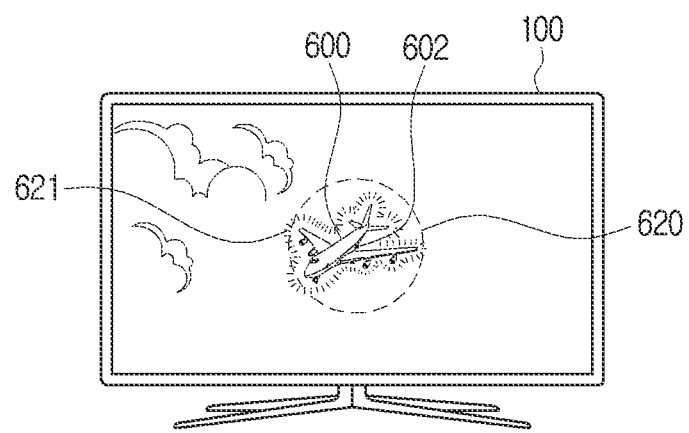

FIGS. 6A and 6B are diagrams illustrating a method of providing a visual effect in consideration of an object according to various embodiments of the disclosure.

Referring to FIG. 6A, the display apparatus 100 may obtain image location information corresponding to the video content based on the received audio content. The display apparatus 100 may also determine whether a specific object is included in the identified area 610 based on one point 601 included in the image location information.

In an embodiment, the display apparatus 100 may provide a visual effect 611 corresponding to the sound generated from an airplane 600 by adjusting the brightness of pixels included in one area 610 based on a volume of the sound included in the audio content when the airplane 600, which is an object having a "transport means" type, is identified to be included in the identified area 610.

According to the operation of the display apparatus 100 described above, when an object is included in one area of the identified video content, a visual effect may be provided through an area adjacent to an object, which is recognized as a point of occurrence of a sound associated with the identification of one area, and user convenience may be improved.

Referring to FIG. 6B, the display apparatus 100 may obtain image location information corresponding to the video content based on the received audio content. The display apparatus 100 may also determine whether a specific object is included in the identified area 620 based on one point 602 included in the image location information.

In an embodiment, the display apparatus 100 may provide a visual effect 621 corresponding to the sound generated from the airplane 600 by adjusting the brightness of pixels corresponding to the airplane 600 based on a volume of the sound included in the audio content when the airplane 600, which is an object having a transport means type, is identified to be included in the identified area 620.

According to another embodiment, the display apparatus 100 may adjust only brightness of the pixels corresponding to the boundary area of the airplane 600 among pixels corresponding to the airplane 600 included in one area 620.

According to the operation of the display apparatus 100 described above, when an object is included in one area of the identified video content, a visual effect may be provided through a boundary area of an object or an area corresponding to an object recognized as a point of occurrence of a sound related to the identification of one area, thereby improving user convenience.

Figure 7:
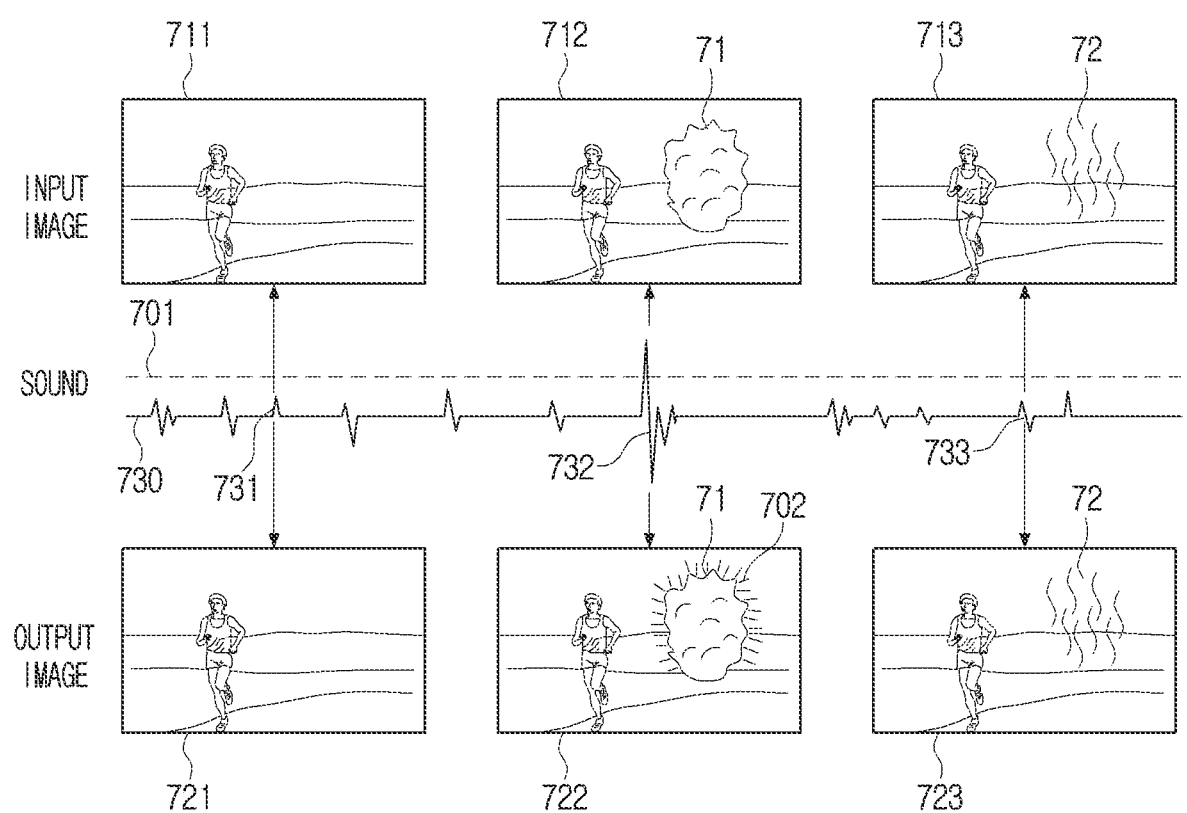
FIG. 7 is a diagram illustrating a method of providing a visual effect in consideration of a sound volume and an object according to an embodiment of the disclosure.

FIG. 7 is a diagram illustrating a method of providing a visual effect in consideration of a sound volume and an object according to an embodiment of the disclosure.

Referring to FIG. 7, the display apparatus 100 may provide a visual effect 702 based on the type of object included in the video content and the volume of sound 730. For example, the sound 730 may be a sound obtained based on a sound volume corresponding to each channel included in the multi-channel information of the audio content. The sound 730 may be a sound obtained based on an average value of a sound volume corresponding to each channel included in the multi-channel information, but the embodiment is not limited thereto.

In a case in which the video content including a plurality of input image frames such as a first frame 711, a second frame 712, a third frame 713, etc. and the audio content related to the sound 730 are received, the display apparatus 100 may identify a frame including a specific object in one area of each frame determined on the basis of multi-channel information among the plurality of input image frames 711, 712, 713, and the like. The display apparatus 100 may identify whether a peak value of the sound 730 is greater than or equal to a threshold value 701 in a section corresponding to the identified frame.

In an embodiment, the display apparatus 100 may provide a visual effect corresponding to the sound 730 through the frame identified such that the peak value of the sound 730 is greater than or equal to the threshold value 701 in a section corresponding to each frame of the identified frames.

The first frame 711 of the input image may not include a predetermined type of object associated with the operation of providing a visual effect based on a type of object and a volume of the sound 730. In an embodiment, the display apparatus 100 may not provide a visual effect corresponding to the sound 730 through the first frame 721 of the output image without identifying whether the peak value of the sound 730 is greater than or equal to the threshold value 701 in the interval 731 corresponding to the first frame 711 of the input image.

The second frame 712 of the input image may include an elastic film 71 of an "explosion effect" type in one area of the second frame 712 determined on the basis of the multi-channel information. In yet another embodiment, the display apparatus 100 may identify that the peak value of the sound 730 is greater than or equal to the threshold value 701 in the interval 732 corresponding to the second frame 712 of the input image, and may provide the visual effect 702 corresponding to the sound 730 through the second frame 722 of the output image.

In still another embodiment, the display apparatus 100 may identify an area corresponding to the elastic film 71 or a boundary area of the elastic film 71 in the second frame 722 of the output image, and may adjust the brightness of the pixels included in the identified area. As a result, all or a portion of the elastic film 71 included in the second frame 722 of the output image may be brighter than the remaining area of the second frame 722.

The third frame 713 of the input image may include a predetermined "explosion effect" type of smoke 72 in one area of the third frame 713 determined on the basis of the multi-channel information. The display apparatus 100 may identify that the peak value of the sound 730 is less than the threshold value 701 in the interval 733 corresponding to the third frame 713 of the input image, and may not provide a visual effect corresponding to the sound 730 through the sound 730 to the third frame 723 of the output image.

According to the operation of the display apparatus 100 described above, the display apparatus 100 may accurately identify an object related to sound generation, and may provide a visual effect corresponding to a sound through an identified object, thereby improving user convenience.

Figure 8:
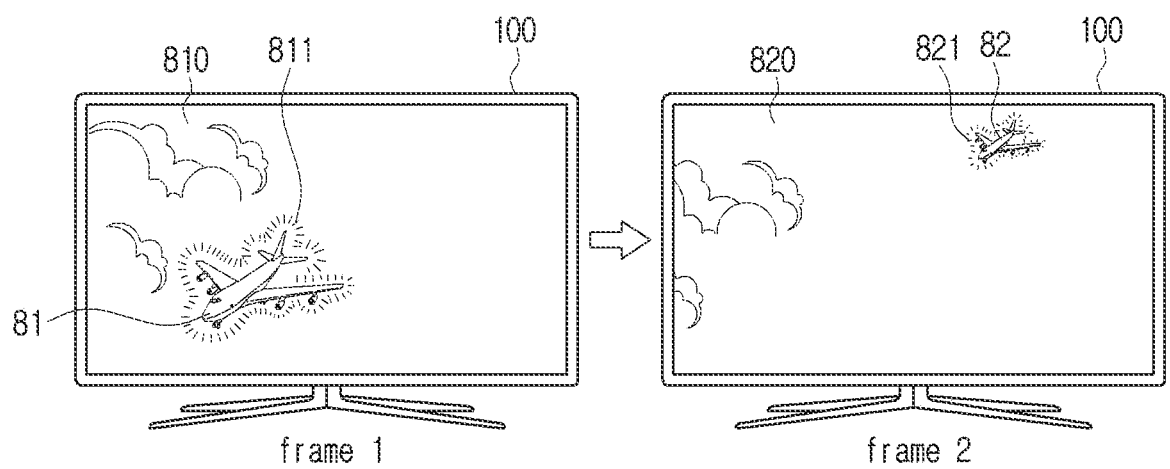
FIG. 8 is a diagram illustrating a method of providing a visual effect in consideration of size of object according to an embodiment of the disclosure.

FIG. 8 is a diagram illustrating a method of providing a visual effect in consideration of size of object according to an embodiment of the disclosure.

Referring to FIG. 8, when a specific object is included in one area of a frame determined on a basis of multi-channel information, the display apparatus 100 may adjust the brightness of pixels corresponding to a specific object based on the sound volume of the audio content and a size of the specific object.

In an embodiment, the first frame 810 and the second frame 820 of the input video content may include airplanes 81 and 82, which are objects having a "transport means" type. The airplane 81 and the airplane 82 may be an object of which all or a part is included in one area on the first frame 810 and one area on the second frame 820 determined based on the multi-channel information of the audio content. The airplane 81 included in the first frame 810 may have a larger size than the airplane 82 included in the second frame 820.

The display apparatus 100, according to an embodiment, may control such that a pixel corresponding to an object emits brighter light as the size of an object included in the frame is larger. Accordingly, the display apparatus 100 may provide a visual effect that is stronger than a visual effect 821 of the second frame 820 provided through the airplane 82 included in the second frame 820 through the airplane 81 included in the first frame 810.

According to the operation of the display apparatus 100 described above, the display apparatus 100 may provide a visual effect in consideration of the size of the object included in each frame in addition to the brightness adjustment based on the sound volume as described in FIG. 5. Thus an advantageous effect may be expected such that the visual effect caused by frame conversion may be more smoothly performed.

Figure 9:
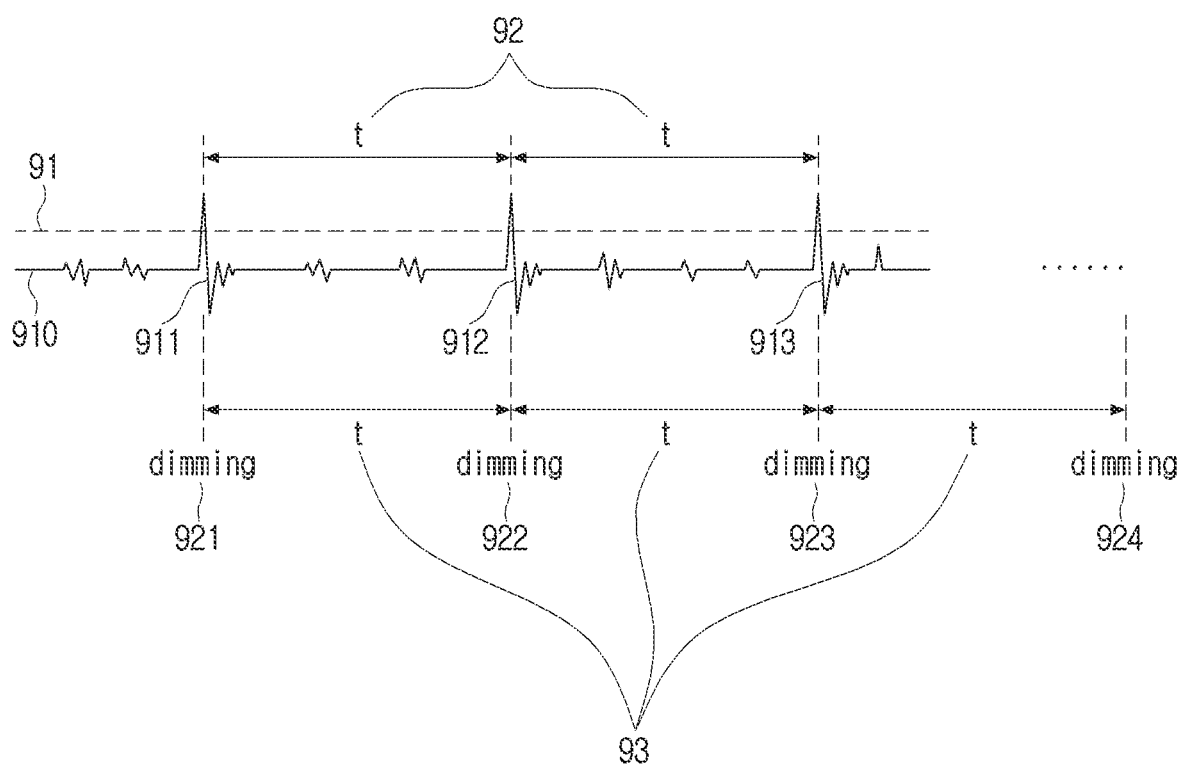
FIG. 9 is a diagram illustrating a method of adjusting brightness of a pixel to a period equal to a sound which is periodically generated according to an embodiment of the disclosure.

FIG. 9 is a diagram illustrating a method of adjusting brightness of a pixel to a period equal to a sound which is periodically generated according to an embodiment of the disclosure.

Referring to FIG. 9, when the audio content is received, the display apparatus 100 may analyze the sound included in the audio content to identify whether the audio content includes a sound greater than or equal to a threshold volume periodically generated. In an embodiment, the display apparatus 100 may identify that the audio content includes a sound 910 that is greater than or equal to a threshold volume 91 that occurs at a constant period 92. The sound 910 having periodicity may be a sound corresponding to a specific channel included in the multi-channel information of the audio content, but is not limited thereto.

In another embodiment, the display apparatus 100 may adjust the brightness of pixels included in one area of the video content to the same period 93 as the constant period 92 of the identified sound 910. For example, the display apparatus 100 may obtain first dimming information 921 for dimming pixels included in one area at a time point 911 corresponding to a first peak value of the identified sound 910, and obtain second dimming information 922 and third dimming information 923 for dimming pixels included in one area at a time point 912 corresponding to a second peak value of the identified sound 910 and a time point 913 corresponding to a third peak value.

According to an embodiment of the disclosure, in a case in which the display apparatus 100 receives and provides content from a source device in real time, the display apparatus 100 may have a difficulty in performing audio content analysis for all time points. The display apparatus 100 may obtain fourth dimming information 924 for dimming the pixels included in one area at a time point corresponding to the fourth peak value of the sound 910 that has not yet been obtained based on the first to third dimming information 921 to 923 for dimming the pixels to the same period 93 as the constant period 92 of the identified sound 910. The display apparatus 100 may adjust the brightness of pixels included in an area of the video content based on the first to fourth dimming information 921 to 924.

According to the operation of the display apparatus 100 described above, it may be possible to predict periodic sound generation even when the display apparatus 100 does not complete reception of the audio content and provide a visual effect corresponding thereto and thus, occurrence of delay time of providing a visual effect corresponding to the sound may be minimized.

Figure 10:
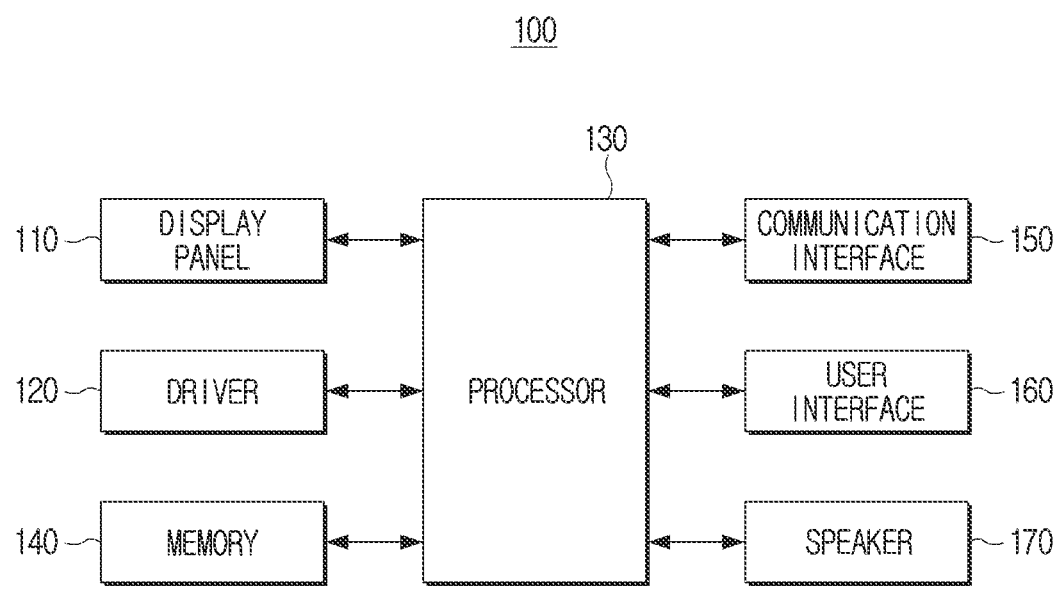
FIG. 10 is a block diagram specifically illustrating a configuration of a display apparatus according to an embodiment of the disclosure.

FIG. 10 is a block diagram specifically illustrating a configuration of a display apparatus according to an embodiment of the disclosure.

Referring to FIG. 10, the display apparatus 100 may include the display panel 110, the driver 120, the processor 130, a memory 140, a communication interface 150, a user interface 160, and a speaker 170. The configurations of FIG. 10 which overlap with the configurations of FIG. 2 will not be further described.

The memory 140 may be configured to store data for various embodiments of the disclosure. The memory 140 may be implemented as a memory embedded in the display apparatus 100, or may be implemented as a removable memory in the display apparatus 100, according to the data usage purpose. For example, data for driving the display apparatus 100 may be stored in a memory embedded in the display apparatus 100, and data for an additional function of the display apparatus 100 may be stored in the memory detachable to the display apparatus 100. A memory embedded in the display apparatus 100 may be a volatile memory such as a dynamic random access memory (DRAM), a static random access memory (SRAM), a synchronous dynamic random access memory (SDRAM), or a nonvolatile memory (for example, one time programmable ROM (OTPROM), programmable ROM (PROM), erasable and programmable ROM (EPROM), electrically erasable and programmable ROM (EEPROM), mask ROM, flash ROM, a flash memory (for example, NAND flash or NOR flash), a hard disk drive or a solid state drive (SSD), and the like. In the case of a memory detachably mounted to the display apparatus 100, the memory may be implemented as a memory card (for example, a compact flash (CF), secure digital (SD), micro secure digital (micro-SD), mini secure digital (mini-SD), extreme digital (xD), multi-media card (MMC), etc.), and an external memory (for example, a USB memory) connectable to the USB port, but the memory is not limited thereto.

The communication interface 150 may input and output various types of data. The communication interface 150 may receive and transmit various types of data with the display apparatus 100 through communication methods such as an access point (AP)-based wireless fidelity (Wi-Fi) (wireless local area network (WLAN)), Bluetooth, Zigbee, wired/wireless local area network (LAN), wide area network (WAN), Ethernet, IEEE 1394, high definition multimedia interface (HDMI), universal serial bus (USB), mobile high-definition link (MHL), advanced encryption standard (AES)/European broadcasting union (EBU), optical, coaxial, and the like.

The user interface 160 may be configured to be involved in performing interaction with the user by the display apparatus 100. The user interface 160 may include at least one of a touch sensor, a motion sensor, a button, a jog dial, a switch, or a microphone, but is not limited thereto.

In a case in which the user remotely controls the display apparatus 100, the user interface 160 may include a receiving unit for receiving a control signal transmitted from a remote control device operated by a user.

The user may select or change various types of information related to providing the visual effect corresponding to the sound included in the audio content through the user interface 160. In an embodiment, the processor 130 may provide a visual effect corresponding to the received user command through the display panel 110, based on receiving a user command, through the user interface 160, that whether a visual effect is provided through an area of a predetermined shape identified based on the multi-channel information, or a visual effect corresponding to an object included in the corresponding area is provided.

The speaker 170 may be a device to convert an electrical sound signal corresponding to audio provided by the display apparatus 100 into a sound wave generated from the processor 130. The speaker 170 may include a permanent magnet, a coil, and a vibration plate, and may output sound by vibrating the vibration plate by electromagnetic interaction between the permanent magnet and the coil. In another embodiment, the processor 130 may control the speaker 170 to output sound included in the audio content corresponding to the video content provided through the display panel 110.

Figure 11:
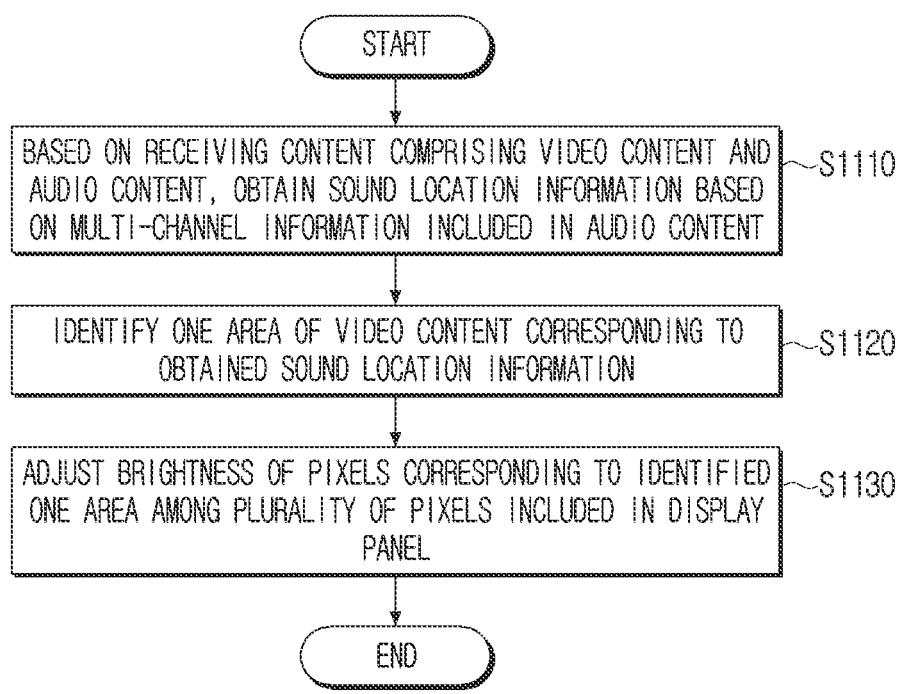
FIG. 11 is a flowchart illustrating a method of controlling according to an embodiment of the disclosure.

FIG. 11 is a flowchart illustrating a method of controlling according to an embodiment of the disclosure.

A method of controlling according to an embodiment may include, based on receiving content comprising video content and audio content, obtaining sound location information based on multi-channel information included in the audio content in operation S1110.

In operation S1120, the method may include identifying one area of the video content corresponding to the obtained sound location information.

In operation S1130, the method may include adjusting brightness of pixels corresponding to the identified one area among a plurality of pixels included in a display panel.

The identifying the one area, in operation S1120, may include identifying a size of one area of the video content based on sound volume of the audio content, and the adjusting brightness of the pixels, in operation S1130, may include adjusting brightness of pixels included in the area of the identified size.

In an embodiment, the adjusting brightness of the pixels, in operation S1130, may include identifying brightness information of one area of the video content based on the sound volume of the audio content; and adjusting brightness of pixels included in the one area based on the identified brightness information.

In another embodiment, the adjusting brightness of the pixels, in operation S1130, may include, based on at least one area of a specific object being included in the identified one area, adjusting brightness of pixels included in an area corresponding to the specific object based on the sound volume of the audio content.

In yet another embodiment, the adjusting brightness of the pixels, in operation S1130, may include, based on a specific object being included in the identified one area, adjusting brightness of pixels included in the one area or pixels corresponding to the specific object based on the sound volume of the audio content and the size of the specific object.

In still yet another embodiment, the adjusting brightness of the pixels, in operation S1130, may include, based on a specific object being included in the identified one area, adjusting brightness of pixels corresponding to a boundary area of the specific object.

The obtaining the sound location information, in operation S1110, may include obtaining the sound location information based on sound volume corresponding to each channel included in the multi-channel information.

The plurality of pixels may include a light emitting diode (LED) pixel, and the adjusting brightness of pixels, in operation S1130, may include identifying a dimming value corresponding to LED pixels included in the identified one area based on the sound volume of the audio content, and adjusting brightness of LED pixels included in the identified one area based on the identified dimming value.

The adjusting brightness of pixels, in operation S1130, may include, based on identifying that the audio content comprises sound which is greater than or equal to threshold volume and is periodically generated, adjusting brightness of LED pixels included in the identified one area to a same period.

According to various embodiments described above, the brightness of pixels included in an area on the video content identified based on the multi-channel information of the audio content may be adjusted, and a visual effect related to the sound may be provided. Accordingly, the attentional engagement of the user may be increased with respect to the content.

The methods according to the various embodiments of the disclosure may be implemented, but is not limited to, as a type of an application installable in an existing display apparatus.

In addition, the methods according to various embodiments may be implemented with software upgrade or hardware upgrade for the conventional display apparatus.

The various embodiments may be performed, but is not limited to, through an embedded server provided in the display apparatus or at least one external server.

The various embodiments described above may be implemented in a recordable medium which is readable by a computer or a device similar to the computer using software, hardware, or the combination of software and hardware. In some cases, embodiments described herein may be implemented by the processor 130 itself. According to a software implementation, embodiments such as the procedures and functions described herein may be implemented with separate software modules. Each of the software modules may perform one or more of the functions and operations described herein.

According to various embodiments described above, machine-readable computer instructions for performing processing operations of the display apparatus 100 according to the various embodiments described above may be stored in a non-transitory computer-readable medium. The machine-readable computer instructions stored in the non-transitory computer-readable medium may cause a particular device to perform processing operations on the display apparatus 100 according to the various embodiments described above when executed by the processor of the particular device.

The non-transitory computer-readable medium is not a medium storing data for a short period of time such as a register, a cache, or a memory, but may refer to a medium that semi-permanently stores data and is readable by a machine. Specific examples of the non-transitory computer-readable medium may include a CD, a DVD, a hard disk drive, a Blu-ray disc, a USB, a memory card, and a ROM.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A display apparatus comprising:
a display panel comprising a plurality of pixels;
a driver configured to drive the display panel; and
at least one processor configured to:
based on receiving content comprising video content and audio content, obtain sound location information based on multi-channel information included in the audio content,
identify one area of the video content corresponding to the obtained sound location information, and
control the driver to adjust brightness of pixels included in the identified one area.

2. The display apparatus of claim 1, wherein the at least one processor is further configured to:
identify a size of one area of the video content based on a sound volume of the audio content, and
control the driver to adjust brightness of pixels included in the area of the identified size.

3. The display apparatus of claim 1, wherein the at least one processor is further configured to:
identify brightness information of one area of the video content based on a sound volume of the audio content, and
control the driver to adjust brightness of pixels included in the one area based on the identified brightness information.

4. The display apparatus of claim 1, wherein the at least one processor is further configured to, based on at least one area of a specific object being included in the identified one area, control the driver to adjust brightness of pixels included in an area corresponding to the specific object based on a sound volume of the audio content.

5. The display apparatus of claim 1, wherein the at least one processor is further configured to, based on a specific object being included in the identified one area, control the driver to adjust brightness of pixels included in the one area or pixels corresponding to the specific object based on a sound volume of the audio content and a size of the specific object.

6. The display apparatus of claim 1, wherein the at least one processor is further configured to, based on a specific object being included in the identified one area, control the driver to adjust brightness of pixels corresponding to a boundary area of the specific object.

7. The display apparatus of claim 1, wherein the at least one processor is further configured to obtain the sound location information based on a sound volume corresponding to each channel included in the multi-channel information.

8. The display apparatus of claim 1,
wherein the plurality of pixels comprise a light emitting diode (LED) pixel, and
wherein the at least one processor is further configured to:
identify a dimming value corresponding to LED pixels included in the identified one area based on a sound volume of the audio content, and
control the driver to adjust brightness of the LED pixels included in the identified one area based on the identified dimming value.

9. The display apparatus of claim 8, wherein the at least one processor is further configured to, based on identifying that the audio content comprises sound which is greater than or equal to threshold volume and is periodically generated, control the driver to adjust brightness of the LED pixels included in the identified one area to a same period.

10. A method of controlling a display apparatus, the method comprising:
based on receiving content comprising video content and audio content, obtaining sound location information based on multi-channel information included in the audio content;
identifying one area of the video content corresponding to the obtained sound location information; and
adjusting brightness of pixels corresponding to the identified one area among a plurality of pixels included in a display panel.

11. The method of claim 10,
wherein the identifying of the one area comprises identifying a size of one area of the video content based on a sound volume of the audio content, and
wherein the adjusting of the brightness of the pixels comprises adjusting brightness of pixels included in the area of the identified size.

12. The method of claim 10, wherein the adjusting of the brightness of the pixels comprises:
identifying brightness information of one area of the video content based on a sound volume of the audio content; and
adjusting brightness of pixels included in the one area based on the identified brightness information.

13. The method of claim 10, wherein the adjusting of the brightness of the pixels comprises, based on at least one area of a specific object being included in the identified one area, adjusting brightness of pixels included in an area corresponding to the specific object based on a sound volume of the audio content.

14. The method of claim 10, wherein the adjusting of the brightness of the pixels comprises based on a specific object being included in the identified one area, adjusting brightness of pixels included in the one area or pixels corresponding to the specific object based on a sound volume of the audio content and a size of the specific object.

15. The method of claim 10, wherein the adjusting of the brightness of the pixels comprises, based on a specific object being included in the identified one area, adjusting brightness of pixels corresponding to a boundary area of the specific object.

16. The method of claim 10, wherein the multi-channel information includes a plurality of sound data corresponding to a plurality of channels.

17. The method of claim 10, wherein the audio content includes at least one of stereo content, left and right channel information, and surround content.

18. The method of claim 10, wherein the identifying of the one area of the video content is based on vector information.

* * * * *